G. E. RIGBY.
FOOT REST FOR MOTOR CYCLES.
APPLICATION FILED JULY 29, 1916.

1,261,442.

Patented Apr. 2, 1918.
5 SHEETS—SHEET 1.

G. E. RIGBY.
FOOT REST FOR MOTOR CYCLES.
APPLICATION FILED JULY 29, 1916.
1,261,442.
Patented Apr. 2, 1918.
5 SHEETS—SHEET 2.
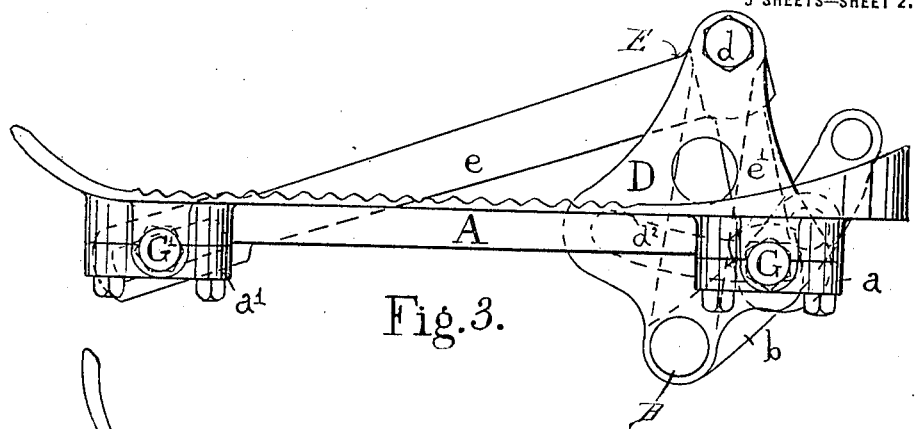
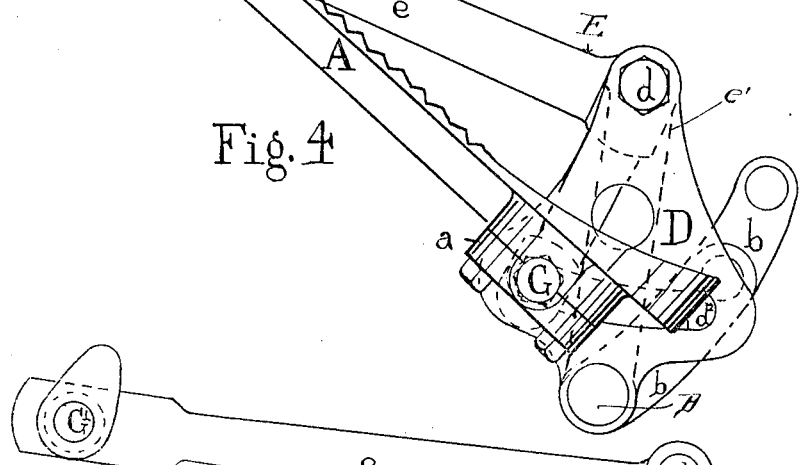

G. E. RIGBY.
FOOT REST FOR MOTOR CYCLES.
APPLICATION FILED JULY 29, 1916.

1,261,442.

Patented Apr. 2, 1918.
5 SHEETS—SHEET 3.

G. E. RIGBY.
FOOT REST FOR MOTOR CYCLES.
APPLICATION FILED JULY 29, 1916.

1,261,442.

Patented Apr. 2, 1918.
5 SHEETS—SHEET 4.

Witnesses:
M. E. McCabe

Inventor
George E. Rigby
by James L. Norris
Attorney

UNITED STATES PATENT OFFICE.

GEORGE EDWIN RIGBY, OF MANCHESTER, ENGLAND.

FOOT-REST FOR MOTOR-CYCLES.

1,261,442.   Specification of Letters Patent.   Patented Apr. 2, 1918.

Application filed July 29, 1916. Serial No. 112,160.

*To all whom it may concern:*

Be it known that I, GEORGE EDWIN RIGBY, a British subject, residing at the city of Manchester, England, have invented certain new and useful Improvements in Foot-Rests for Motor-Cycles, of which the following is a specification.

This invention relates to foot rests for motor cycles or the like.

These as hitherto constructed have been mounted upon two adjustable transverse rods or stays one toward the front end and the other toward the rear end and both passing from one side of the machine to the other.

The object of this invention is to provide foot rests mounted upon a single transverse rod or stay passing from side to side of the machine or upon two single brackets one at either side of the machine.

The invention will be fully described with reference to the accompanying drawings.

Figure 1:
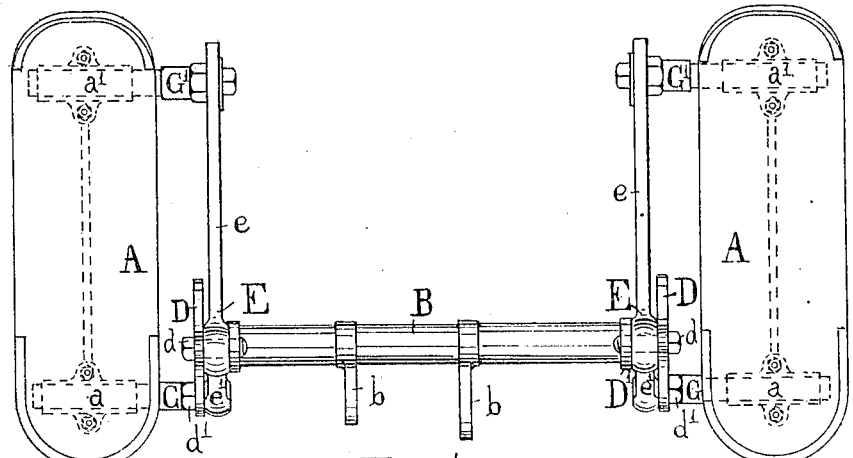

Figure 1. is a plan of the foot rests with single transverse supporting bar or stay and quadrants.

Figure 2:
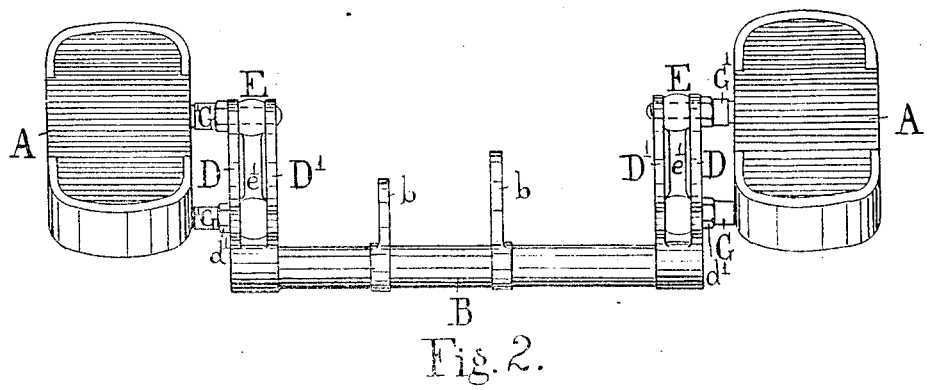

Fig. 2. is an elevation of same from the rear.

Fig. 3. is a side elevation showing the foot rest in horizontal position.

Fig. 4. is a side elevation showing the foot rest in its elevated position.

Fig. 5. is a side elevation showing a modified construction of foot rest.

Figure 6:
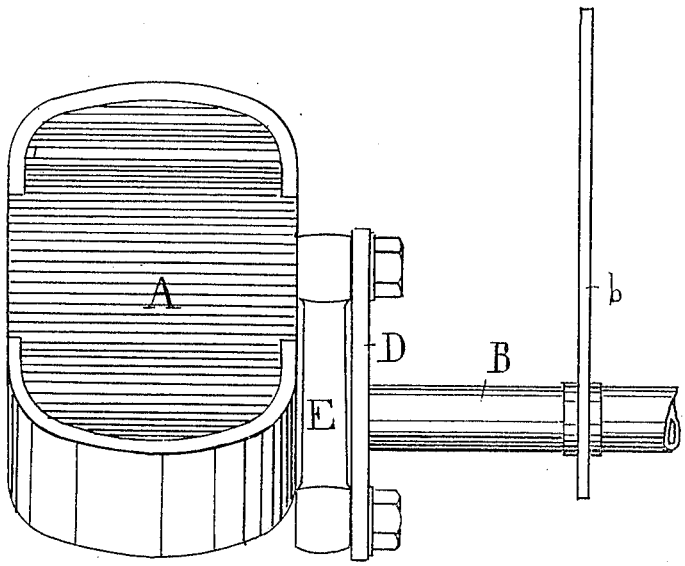

Fig. 6. is an elevation from rear of one foot rest showing a modified construction of radius lever support.

Figure 7:
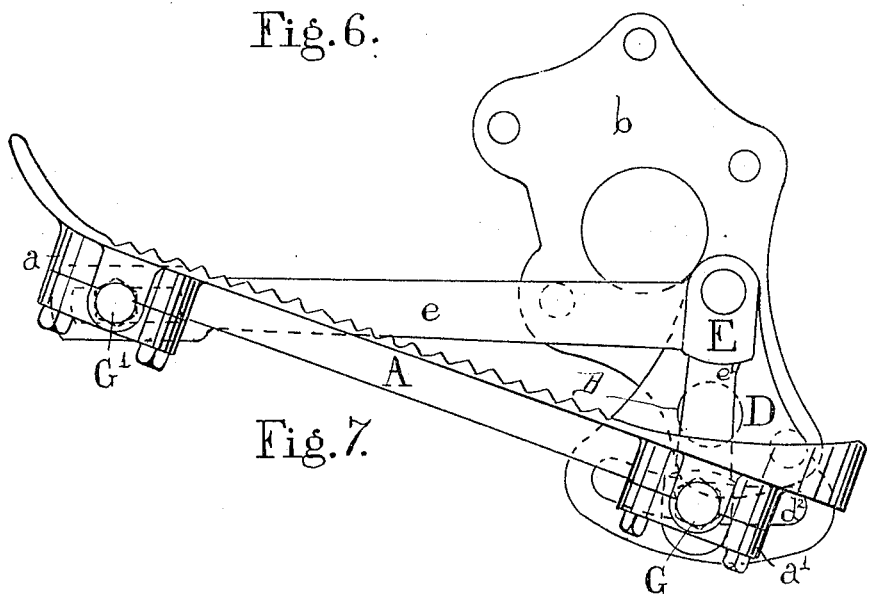

Fig. 7. is a side elevation of same.

Figure 8:
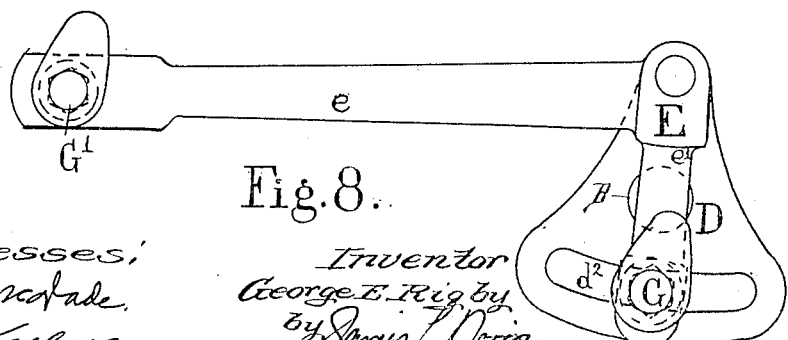

Fig. 8. is a side elevation showing a modified construction of foot rest.

Figure 10:
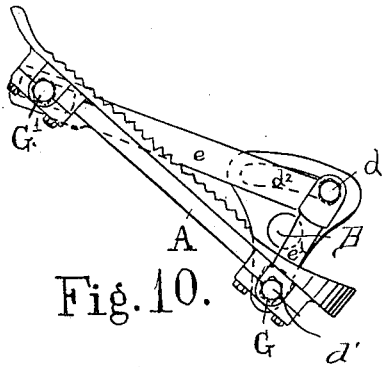
Figure 9:
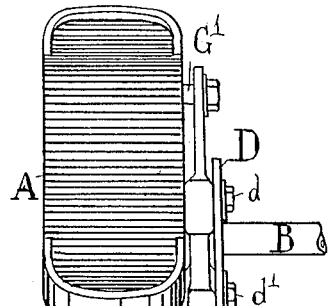

Figs. 9 and 10. are rear and side elevations showing the radius plate in a reversed position.

Figure 12:
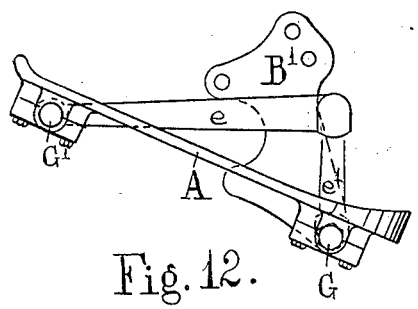
Figure 11:
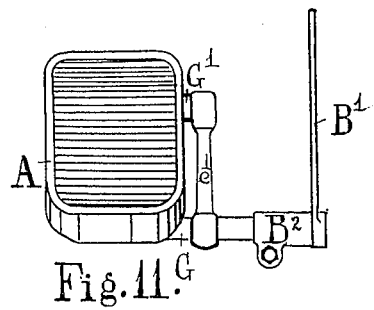

Figs. 11 and 12. are rear and side elevations showing a modification in which a radius plate is dispensed with.

Figure 14:
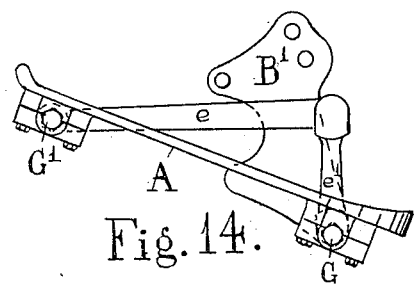
Figure 13:
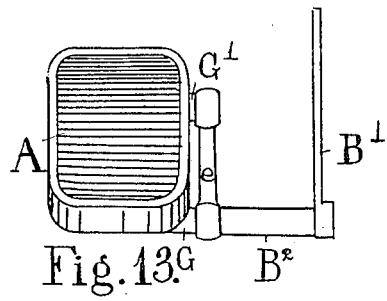

Figs. 13 and 14. are rear and side elevations showing a modification in which the foot rest is rigidly fixed at the desired inclination.

Figure 16:
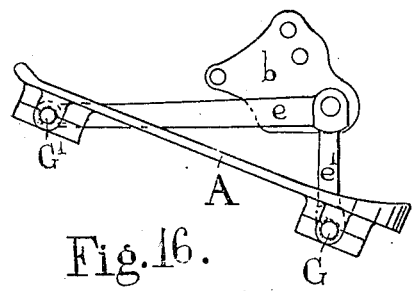
Figure 15:
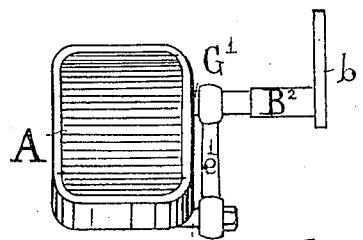
Figure 18:
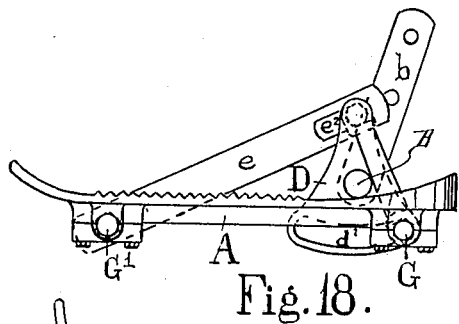
Figure 17:
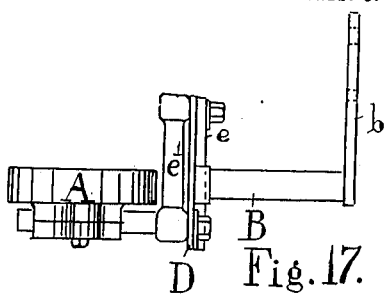
Figure 20:
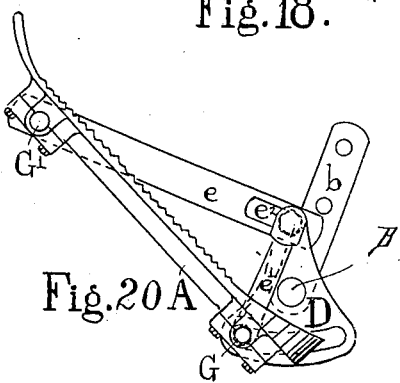
Figure 19:
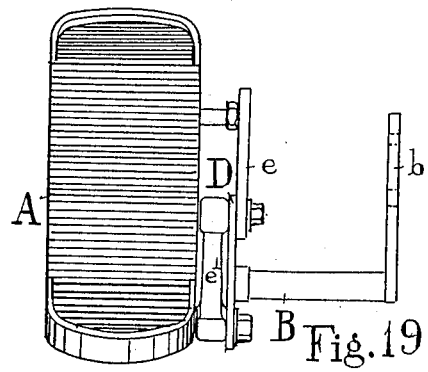
Figure 22:
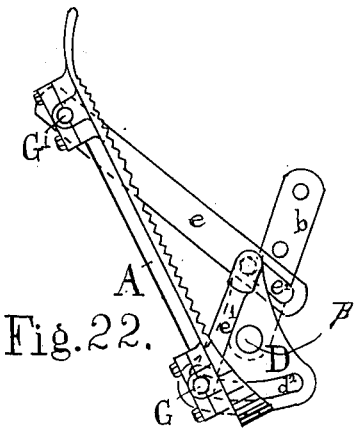
Figure 21:
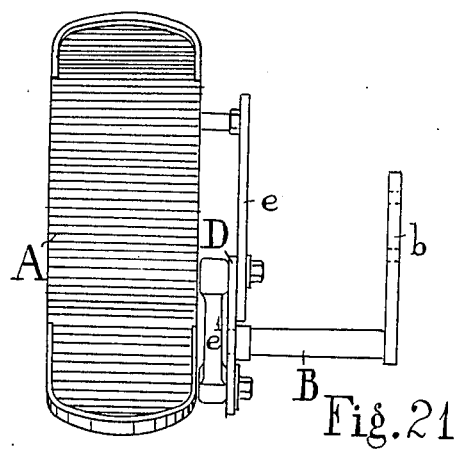
Figure 24:
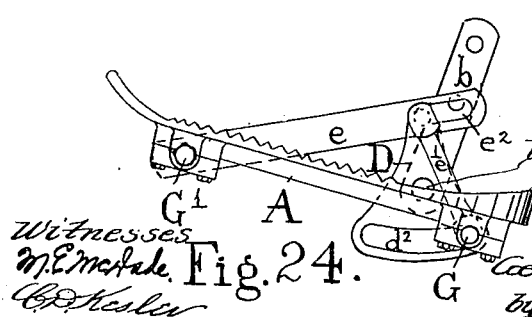
Figure 23:
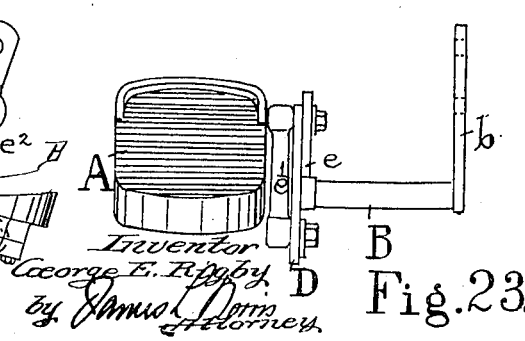

Figs. 15 and 16. are rear and side elevations showing a further modification.

Figs. 17 to 24. Rear and side elevations in different positions showing a modification with two radius members pivoted together whereby a greater variation of positions can be obtained.

The foot rests A—which may be of ordinary construction—are carried or supported by a single transverse rod or stay B attached to any fixed part of the frame, bottom bracket or engine plates of the motor cycle, or each foot rest A may be carried by a single bracket or stud attached by bolts or otherwise to the frame, bottom bracket, or engine plates.

The transverse rod or stay B may be solid or tubular and is provided with lugs or brackets $b$ by which it is rigidly affixed to any part or member of the motor cycle frame.

At each end the rod or stay B is preferably fitted with a quadrant plate D rigidly affixed thereto from which the foot rests are suspended by an adjustable crank or radius arm E.

The crank or radius arm E is of any suitable shape with a forwardly projecting member $e$ and a downwardly projecting member $e'$ respectively carrying a stud or member G G'.

The crank or radius arm E is pivoted upon a stud or bolt $d$ passing through the quadrant plate D, its lower member $e'$ being fitted with a clamping stud or bolt $d'$ (which may be the rear end of the stud or member G) which passes into a quadrant slot $d^2$ in the plate D to clamp the crank or radius arm E in any desired position.

The crank or radius arm E is preferably in one piece pivoted as shown, though if desired the two members $e$ and $e'$ may be separate and both pivoted upon the quadrant stud or member $d$. The foot rest A is provided on its under side with sockets $a$ $a'$ by which it is mounted upon the laterally projecting studs or members G and G' respectively.

In the form shown in Figs. 1 to 5 the transverse rod or stay B passes from side to side of the machine being affixed in position by the lugs $b$. At each end it is fitted with a quadrant plate D and behind the plate D a supporting strut or lug D' is fitted to give greater rigidity, the crank or radius arm E being pivoted between the two on a stud or pin passing through both. In this case the stud or member G passes through the slot $d^2$ in the quadrant plate and the end $d'$ is secured into the lower member $e'$ of the crank or radius arm E. The foot rest A is mounted on the two studs G G' and by adjusting the member $e'$ of the radius arm E the position of the foot rest can be adjusted to any inclination.

The foot rest A is preferably in the form of a plate mounted upon the studs or members G G' by sockets $a$ on the under side or it may be attached thereto in any other suitable way, but if desired the plate or rest A may be dispensed with and the studs or members G G' may themselves form two foot rests for each foot as shown in Fig. 5 which can be set at any desired position.

In the form shown in Figs. 6 to 8, to each end of the transverse stay or rod a quadrant plate D is fitted to which the crank or radius arm E is pivoted at its upper end. The quadrant plate is formed with a quadrant slot $d^2$. The radius arm E is pivoted on the stud or pin $d$ and the end of the stud or pin G passes through the quadrant slot $d^2$. The foot rest A is mounted on the studs G G' and by adjusting the member $e'$ of the radius arm E along the slot $d^2$ the position of the foot rest A may be adjusted to any inclination. The foot rest A is preferably in the form of a plate mounted on the studs or members G G' of the radius arm E but the plate or rest may be dispensed with and the studs G G' may themselves form two foot rests for each foot as shown in Fig. 8 which can be set in any desired position.

In the form shown in Figs. 9 and 10 the transverse stay or rod B is fitted at each end with a quadrant plate D, in this case the position of the quadrant is reversed the quadrant slot $d^2$ being at the top. The radius arm is pivoted by its lower member on the stud or pin $d'$ and the stud or pin $d$ passes through the slot. The foot rest A is mounted on the studs G G' and its position and inclination is adjusted by moving the stud or pin $d$ in the slot $d^2$. The plate may be dispensed with and the studs G G' form the foot rest.

In the form shown in Figs. 11 and 12 a transverse rod or stay such as previously described may extend across the machine or instead a bracket B' may be bolted to the engine plate or other part of the frame at both sides of the machine. In this modification the quadrant plate at each side previously described is dispensed with and a socket $B^2$ attached to the end of the transverse bar or to the bracket B', the end of the stud G is prolonged to the other side of the member $e'$ of the radius arm E and projects into the socket $B^2$ in which it is tightly clamped by a pinching screw. The radius arm can be swiveled in the socket $B^2$ to set the foot rest A at any inclination. The foot rest A is mounted as previously described.

In the form shown in Figs. 13 and 14 a transverse rod or stay such as previously described may extend across the machine or instead a bracket B' may be bolted to the engine plate or other part of the frame at both sides of the machine. In this modification as in Figs. 11 and 12 the quadrant plates previously described are dispensed with a socket $B^2$ attached to the end of the transverse bar or to the bracket B' the end of the stud G is prolonged to the other side of the member $e'$ of the radius arm E and projects into the socket $B^2$ in which it is brazed when set at the desired inclination. The foot rest A is mounted thereon as previously described.

In either of the variations shown in Figs. 11 to 14 a stud or pin may project from the junction of the two members $e$ $e'$ of the radius arm E and engage in the socket $B^2$ as shown in Figs. 15 and 16.

In the forms shown in Figs. 17 to 24 the radius arm E is made with two separate members $e$ and $e'$ with a slot $e^2$ in the member $e$ which gives a greater range of positions for the foot rest A not only allowing of alteration of inclination but also allows of it being moved backward and forward without altering the inclination. In other respects it is similar to the form described in Figs. 1 to 5.

It is to be understood that in any of the forms shown a transverse rod or stay such as B may extend from side to side of the machine or brackets such as B' may be bolted to both sides.

In a further modification instead of a swinging radius arm or bar or in addition thereto either the front supporting studs or pins G' or the rear supporting stud or pin G, may be fitted with a vertical stud or socket or with an eccentric or rack or other device by which the front or rear end of the foot rest can be raised or lowered, or the studs or members themselves may be adjustable vertically, holes or slots being provided for the purpose.

The foot rests A being thus carried by the crank or radius arm E suspended from the transverse rod or stay B or from brackets B' the rear and front ends of the foot rests are rigidly supported without a second transverse shaft or bar and can be set to any desired inclination by swinging the radius arms about their pivots also where vertical adjustment is provided by raising or lowering one end of the foot rest.

What I claim as my invention and desire to protect by Letters Patent is:—

1. A foot rest means for motor cycles and the like comprising a foot support in combination with a cranked radius arm for the foot support, and means for sustaining the support in applied position.

2. A foot rest for motor cycles and the like comprising foot plates in combination with cranked radius arms upon which the plates are mounted, and supporting means for each foot plate.

3. Foot rests for motor cycles and the like comprising foot plates, cranked radius arms on which the plates are mounted, and a transverse stay for supporting the radius arms.

4. Foot rests for motor cycles and the like comprising in their construction foot plates in combination with radius arms, a single transverse stay or strut upon which the radius arms are supported, quadrant plates affixed to the ends of the transverse stay or strut and means for adjusting the angle of the radius arms and foot plates.

5. Foot rests for motor cycles and the like comprising in its construction a foot support at each side, a cranked radius arm provided with forward and rearward members, by which the foot support is carried, a quadrant plate to which the cranked radius arm is pivoted, means for adjusting the arm on the said quadrant plate, and a single supporting strut extending from side to side and attached to said plate.

6. Foot rests for motor cycles or the like comprising foot engaging means, supporting means for the foot engaging means, quadrant plates rigidly attached to the supporting means, and adjustable cranked radius arms pivoted to the quadrant plates and provided with laterally projecting studs having the foot engaging means mounted thereon.

7. Foot rests for motor cycles and the like comprising in their construction a single transverse strut rigidly affixed to the frame and extending from side to side of the cycle, a radius plate fitted on each end of the transverse strut, a cranked radius arm pivoted to each radius plate and capable of adjustment thereon and a foot support carried by each radius arm.

In testimony whereof I have hereunto set my hand in presence of two subscribing witnesses.

GEORGE EDWIN RIGBY.

Witnesses:
J. OWEN O'BRIEN,
GEORGE H. O'BRIEN.

Copies of this patent may be obtained for five cents each, by addressing the "Commissioner of Patents, Washington, D. C."